Nov. 18, 1969  A. BAKER  3,478,449
EXCAVATING BUCKET DIGGING BLADE
Filed Feb. 7, 1967  2 Sheets-Sheet 1
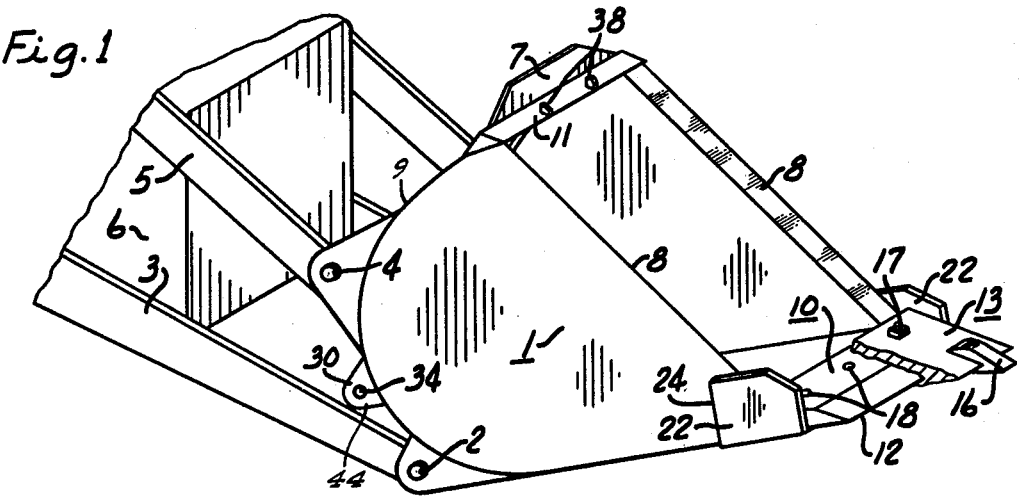
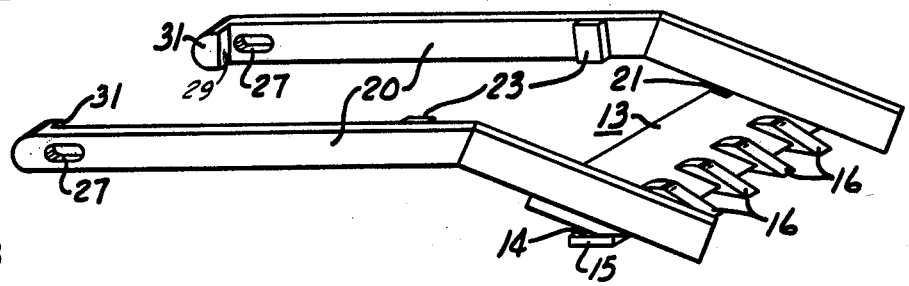
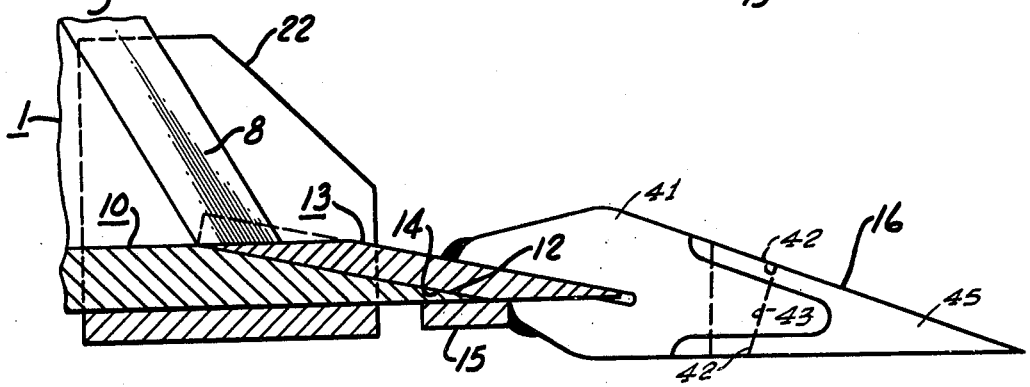
INVENTOR.
ALFRED BAKER
BY
CAROTHERS & CAROTHERS
HIS ATTORNEYS Nov. 18, 1969    A. BAKER    3,478,449
EXCAVATING BUCKET DIGGING BLADE
Filed Feb. 7, 1967    2 Sheets-Sheet 2
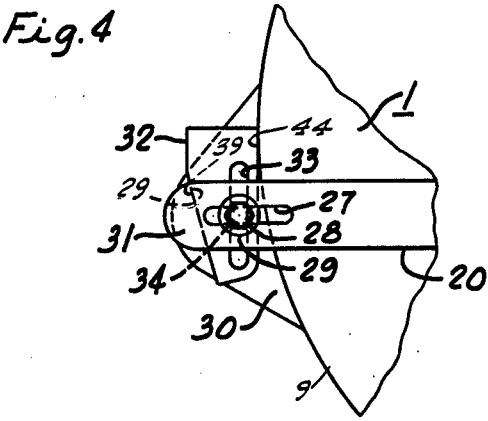
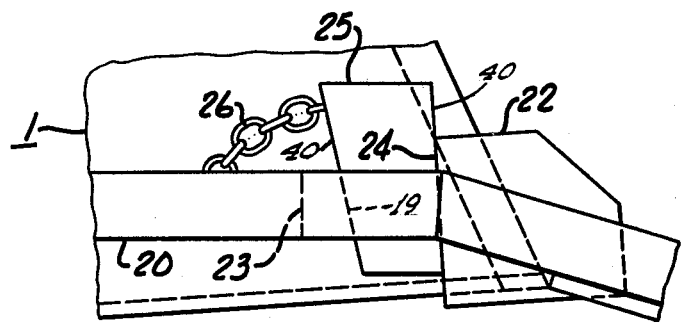
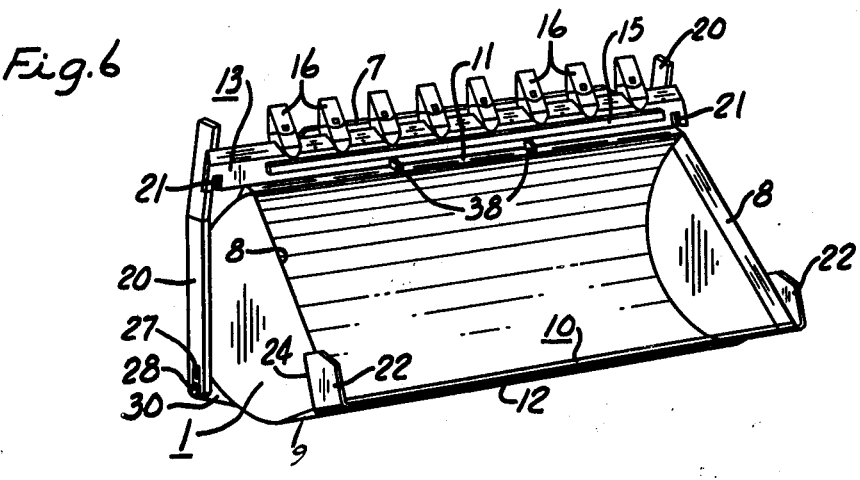
INVENTOR.
ALFRED BAKER
BY CAROTHERS & CAROTHERS
HIS ATTORNEYS United States Patent Office 3,478,449
Patented Nov. 18, 1969

3,478,449
EXCAVATING BUCKET DIGGING BLADE
Alfred Baker, 28 Sharp Ave.,
Washington, Pa. 15301
Filed Feb. 7, 1967, Ser. No. 614,471
Int. Cl. E02f 3/74, 3/81, 9/28
U.S. Cl. 37—141
12 Claims

ABSTRACT OF THE DISCLOSURE

An excavating bucket digging bar having spaced forwardly projecting teeth and a rearwardly facing under pocket to mate over the bucket cutting bar when tightly secured in clamped relation to reinforce the digging bar when in use and pivotally carried by the bucket to swing to a locked position at the top of the bucket to function as a splash bar and add its weight to aid in the action of the bucket cutting bar.

Background of the invention

Excavating buckets are provided with a smooth heavy continuous cutting bar along their forward edge for cutting, scraping, and digging. If the material is not solidly packed or rock-hard this cutting bar without teeth is used. This is particularly true for high lift excavator buckets where soft fill must be moved, leveled, compressed, and releveled. Spaced teeth on the cutting bar is undesirable in such situations since it would leave deep grooves in the ground surface being graded which induce washes on graded sloping surfaces and uneven graded flat surfaces.

If the ground to be dug is hard packed and heavy with rock then a toothed edge on the cutting bar must be used. The bucket is held up and after cleaning, the teeth are bolted to the cutting bar. Without reinforcement this cutting bar, that has been converted to a toothed digging bar, is found to frequently break. For example in a bucket of two cubic yards and having a seven foot width and provided with ten teeth which project forwardly thereof, the teeth are apt to break when one or two teeth strike a single imbedded rock when considering the total digging force of a high lift machine. A broken tooth means down time because the blade has to be reinforced where the tooth broke.

Again when changing on the job from a digging bar with all teeth to a cutting bar with no teeth, or vice versa, considerable time is consumed on the job, the nuts and bolts and the teeth themselves are lost. These items are very difficult to keep track of, let alone the expense, and inconvenience caused one in their use and employment.

Summary of invention

The excavating bucket of this invention is provided with a heavy digging bar that has teeth welded thereto and which are retained thereon unless worn or broken. This digging bar has an under bar secured to the under side of the digging bar without interfering with the replacement of the teeth, and in such a manner to provide a rearwardly facing transverse pocket shaped to receive and fit the cutting bar of the bucket. Thus the digging bar becomes reinforced by the cutting bar and if a tooth breaks off the bucket, the bar is not harmed and does not need to be reinforced. The tooth is merely replaced.

This digging bar may be bolted in place on the front of the bucket with good effective use. However, when it is provided with rearwardly extending arms pivoted to the back of the bucket, it may be moved forward to release the cutting bar from the digging bar pocket and be swung to the top of the bucket where it functions as a higher dirt shield and retains the same weight on the bucket to which the operator is accustomed.

The unfastening and pivotally moving the digging bar to the top of the bucket and locking the same is a matter of a short time comparative to the removal and substitution of one tooth on the conventional cutting bar. One has no chance to lose the nuts, bolts or teeth and the digging bar is always on the machine ready for use.

The digging bar when pivoted to the back of the bucket to swing up in front of the splash plate to supplement and thus enhance the function of the splash plate itself provides a new and novel feature comprising this invention. Securing means such as wedges are used to hold this bar in place whether it is placed in digging position or in storage position as a supplement splash bar. A wedge is driven between opposed faces of the pivot arms and of the bucket for both the digging and storage positions. When the wedges are chained to the high lift machine, all implements for excavation are always present for use which is a material savings in time because of the prevention of loss of parts which is an important object of this invention.

Other objects and advantages appear hereinafter in the following description and claims.

Brief description of drawings

The accompanying drawings show, for the purpose of exemplification without limiting the invention or claims thereto, certain practical embodiments illustrating the principles of this invention wherein:

FIG. 1 is a perspective view in side elevation of a bucket carrying a digging bar comprising this invention.

FIG. 2 is a perspective view of the digging bar having arms and with teeth attached.

FIG. 3 is a view in vertical section of the digging bar on a bucket.

FIG. 4 is an enlarged side view showing one form of clamping the digging bar in position by a wedge at rear of the bucket.

FIG. 5 is an enlarged side view showing one form of clamping the digging bar in position by a wedge at the front of the bucket.

FIG. 6 is a perspective view in front elevation showing the digging bar in its storage position and functioning as a splash bar.

Referring to FIG. 1 of the drawings the bucket 1 shown to illustrate the principles of this invention is that of a high lift bucket. Other types of buckets may employ this demountable digging bar. The bucket 1 is pivotally supported at 2 on the ends of the lift arms 3, and on the pivots 4 and the dump arms 5. The lift and dump arms 3 and 5 are in turn pivotally supported on the tractor power unit 6.

The upper end of the bucket is provided with a splash shield 7 which prevents the dirt from falling back when the bucket is full or when the bucket, upon its lift and dump pivots 3 and 5 brought sharply back.

If the bucket is being used to lift water out of a hole the forward sides 8 of the bucket are held substantially horizontal and under these circumstances the bottom cutting bar 10 and upper bucket rim 11 would also be substantially in the same horizontal plane.

As illustrated in FIGS. 2 and 6 the bottom cutting bar 10 which is integral with the bucket wall and is made of heavy plate considerably heavier than the side walls and circular U shaped section 9 of the bucket. The forward sides 8 are also of heavier steel. As shown the forward edge of the cutting bar 10 is beveled downwardly at 12. This not only provides a sharper edge for the cutting bar but also provides a ledge to receive the individual teeth directly on the cutting bar. In the usual cutting bar of a bucket of this kind, holes are provided for the purpose of bolting teeth directly thereto. However, with the present invention such holes are not necessary unless the digging bar 13 is not pivoted on the structure but merely bolted directly to the cutting bar 10.

The downward and forwardly sloping edge 12 also provides a ledge for receiving a shaped pocket 14 on the under side of the digging bar 13. This transverse rearwardly facing pocket 14 fits on the top of the cutting bar 10 and is also shaped to fit the downwardly sloping forward edge 12. At times the forward facing surface may be provided with a shoulder of a knee which would also be fitted by the pocket. The better the fit between the top, bottom and forward edge surfaces of the cutter bar 10 and the complementary surfaces in the pocket 14 of the digging bar 13, the better the reinforcement of these two bodies.

As shown in FIG. 1, the bottom of the pocket 14 is formed by the under bar 15 welded integrally with the under side of the digging bar 13 and which backs up the under section of the teeth 16 that may be secured to the digging bar by bolts 17. The whole of the digging bar may be bolted to the cutting bar by employing similar bolts 17 through the holes 18 in the cutting bar 10. As an alternative to this structure the digging bar 13 may be extended beyond the sides of the bucket 1 and provided with the rearwardly extending arms 20, as shown in FIG. 2. As shown in FIG. 3, each of the teeth 6 comprise a removable tip 45 which is securably removable to the tooth base 41 by means of a drift pin (not shown). The openings 42 in the removable teeth tips 45 and the openings 43 in the tooth base 41 are aligned to receive the drift pin.

As shown in FIG. 2, the rear edge of the digging bar 13 may be notched out at 21 to receive the forwardly projecting angle plates 22, illustrated in FIGS. 1 and 3, which reinforce the sides and corners of the cutting bar 10 and the bucket.

In FIG. 2 lugs 23 may be secured to the inside of each of the arms 20 and positioned thereon so its wedge surfaces 19 are spaced from the rear face or wedge surface 24 of the angle plates 22 between which may, then, be driven the wedges 25, as shown in FIG. 5, to securely hold the digging bar 13 locked over the cutting bar 10 when the latter is fitted into the digging bar pocket 14. This outer locking arrangement is very much more simplified and secure than in comparison to the bolting method, as the bolts become lost and a large amount of time and expense is consumed in removing and securing teeth on the bucket cutting edge especially when considering the present day labor costs. The wedges 25 are readily locked by a chained drift lock 26.

The rear of the arm 20 may be provided with a pivot opening such as the slots 27 to receive the bolts 28 which pass through lugs 30 welded to the back of the bucket above the lift arm pivots 2 but flush with the sides of the bucket. As thus shown in FIGS. 3 and 4 a lug 31 is provided on the inside of each of the arms 20 adjacent its rear end and is constructed to be opposite a wedge 32 that is slotted at 33 to receive the bolt 28. The bolt 28 passes through the washer 29, then the slot 27 of the arm 20, then the slot 33 of the wedge 32, thence the hole 34 of the lug 30 and then receives a lock washer and a nut, the entire assembly being maintained on the bolt 28 by means of a cotter key.

When the digging bar 13 has been fitted with its pocket 14 over the cutting bar 10, the wedges 32 at the ends of the arms 20 may be driven down between and against the wedge surfaces 29 at the ends of the arms 20 and the bucket wedge surface in the form of back wall 44 of the U shaped bucket section 9 to lock the digging bar in place. If the nuts have not already been tightened they may be tightened to maintain this wedge against the edge 39 of the wedge 32 to prevent it from jarring loose.

Thus the digging bar 13 has three different modes of fastening to the bucket. The latter mode illustrated in FIGS. 2, 4, 5 and 6 is preferable as it will readily maintain the digging bar 13 when perched on its saddle 38 is mounted at the top and in front of the splash shield 7.

This saddle has a seat in which to receive the rear edge of the digging bar and when the wedges 32 have been secured to hold the digging bar in upright secured position.

The digging bar when employed in this manner as a splash shield increases the capacity of the bucket in handling dirt. It provides added weight at the top of the bucket making it a more balanced bucket to handle increased loads of dirt and other such material, all which increases the efficiency of operation.

In so far as the claimed structure sets forth the structure relating to the wedge surfaces 24 and 44, latter being the back surface of the bucket 1, these surfaces both functioning as lateral wedge surface means supported from the bucket 1. The oppositely facing cooperative wedge surfaces on the side arms 20 are the surface 19 of lug members 23 as well as the lug surfaces 29 of members 31. Again the wedges 25 and 32 function between their respective wedge surfaces 40 and 39 to lock the digging bar 13 with its pocket 14 over the cutting bar 10.

I claim:

1. A high lift excavator bucket having along its front bottom edge of transverse cutting bar, a solid and straight beveled edge continuous for the entire length of said cutting bar, a secondary retractable digging bar having a forward transverse edge and comprising two transverse bar members secured together along one of their respective edges to form a rearwardly facing transverse beveled pocket open at both ends for mating in straight unbroken continuous tranverse contact with and maintained in locking engagement over said solid and straight continuous cutter bar beveled edge, spaced teeth positioned along said forward transverse edge of said secondary retractable digging bar, and movable securing means to releaseably hold said digging bar in position on said cutting bar with said pocket in unbroken continuous contact in locked engagement on said cutting bar.

2. The high lift excavator bucket of claim 1 characterized in that each of said teeth comprise a base secured to said transverse bar members and a tooth tip removably securable to said base.

3. The high lift excavator bucket of claim 1 characterized by rearwardly extending side arms secured to the ends of said digging bar and extending rearwardly along the sides of said bucket, pivot means on said bucket to support and rotatably secure the rearward end of each of said arms on said bucket.

4. The high lift excavator bucket of claim 3 characterized by a saddle on the upper transverse rearward edge of said bucket to support said retractable digging bar when swung by said arms about said pivot means to said rearward edge of said bucket.

5. The high lift excavator bucket of claim 3 characterized in that said pivot means comprises a pair of lugs secured to said bucket rear wall, a longitudinal slot in said side arms, lug members on said side arms provided with wedge surfaces, an oppositely facing cooperative wedge surface on said bucket, and wedge means engageable between said oppositely facing cooperative wedge surfaces to forceably positioned said digging bar transverse pocket onto said cutting bar beveled edge.

6. The high lift excavator bucket of claim 5 characterized in that said wedge means are provided with a slot therethrough, said securing means comprises bolt means securable through said wedge means slots and said side arm slots to secure said digging bar in locked engagement on said cutting bar.

7. The high lift excavator bucket of claim 6 characterized by a saddle on the upper transverse rearward edge of said bucket to support said retractable digging bar when swung about said pivot means and into said saddle, said securing means to hold said digging bar in locked engagement in said saddle.

8. The high lift excavator bucket of claim 7 characterized in that said saddle comprises a seat, said wedge means disengageable from between said oppositely facing cooperative wedge surfaces to retract and forceably position surfaces to receive said wedge means are adjacent said cutting bar.
and secure said digging bar in said seat upon tightening of said securing means.

9. A high lift excavator bucket having along its front bottom edge a transverse cutting bar, a digging bar including a transverse plate positioned relatively over said cutting bar, spaced teeth secured to the forward edge of said digging bar, an under bar secured to the bottom of said digging bar to provide a rearwardly facing transverse pocket to fit and lock over the edge of said cutting bar, securing means to hold said digging bar in position with said pocket locked over said cutting bar, rearwardly extending side arms secured to the ends of said digging bar and extending to the back of said bucket, pivot means on the rear wall of said bucket to support and rotatably secure the rearward end of each of said arms on said bucket, said securing means includes a lateral wedge surface means supported from said bucket to provide cooperative wedge surfaces, oppositely facing cooperative wedge surfaces on said side arms, and wedge means secured between said oppositely facing cooperative wedge surfaces to tighten and hold said digging bar pocket tightly against said bucket cutting bar.

10. The high lift excavator bucket of claim 9 characterized in that said oppositely facing cooperative wedge 11. The high lift excavator bucket of claim 9 characterized in that said opposed cooperating wedge surfaces to receive said wedge means are adjacent said pivot means on the rear of said bucket to secure said arms.

12. The high lift excavator bucket of claim 9 wherein said lateral surface means is the rear wall of said bucket.

References Cited

UNITED STATES PATENTS

| | | | |
|---|---|---|---|
| 2,227,674 | 1/1941 | Ratkowski | 37—142 |
| 2,707,343 | 5/1955 | Baer | 37—142 |
| 3,375,597 | 4/1968 | Michael | 37—118 X |
| 1,189,587 | 1/1916 | Lamb | 172—753 |
| 1,872,307 | 8/1932 | Lehman | 37—141 |
| 1,963,847 | 6/1934 | Jersey | 37—141 |
| 2,189,745 | 2/1940 | Johnson | 172—719 |
| 2,211,786 | 8/1940 | Lehman et al. | 37—141 |
| 2,262,415 | 11/1941 | Williams et al. | 172—777 |
| 2,285,039 | 6/1942 | Lowe | 37—141 |
| 3,014,606 | 12/1961 | Kampert et al. | 214—145 |
| 3,043,032 | 7/1962 | Discenza | 214—145 X |
| 3,160,967 | 12/1964 | Nichols | 37—141 |

EDGAR S. BURR, Primary Examiner

U.S. Cl. X.R.

37—117.5; 172—719, 751, 749